United States Patent
Cardo (10) Patent No.: US 9,273,697 B2
(45) Date of Patent: Mar. 1, 2016

(54) COOLING A DRUM PUMP MOTOR AND/OR BATTERY

(71) Applicant: Finish Thompson Inc., Erie, PA (US)

(72) Inventor: Douglas A. Cardo, Erie, PA (US)

(73) Assignee: Finish Thompson Inc., Erie, PA (US)

( * ) Notice: Subject to any disclaimer, the term of this patent is extended or adjusted under 35 U.S.C. 154(b) by 614 days.

(21) Appl. No.: 13/691,159

(22) Filed: Nov. 30, 2012

(65) Prior Publication Data

US 2014/0154098 A1 Jun. 5, 2014

(51) Int. Cl.
| | |
|---|---|
| *F04D 13/06* | (2006.01) |
| *F04B 39/06* | (2006.01) |
| *B25F 5/02* | (2006.01) |
| *F04D 29/58* | (2006.01) |
| *B25F 5/00* | (2006.01) |
| *H02K 9/04* | (2006.01) |

(52) U.S. Cl.
CPC ............ *F04D 29/5806* (2013.01); *B25F 5/008* (2013.01); *F04B 39/066* (2013.01); *F04D 13/068* (2013.01); *H02K 9/04* (2013.01)

(58) Field of Classification Search
CPC .......... F04B 17/03; F04B 17/04; F04B 17/06; F04B 35/06; F04B 39/06; F04B 39/066; F04D 13/06; F04D 13/08; F04D 13/068; B25F 5/008; H01M 10/613; H01M 10/6235; H01M 10/6563
USPC .............. 417/234, 313, 366, 368, 411, 423.3, 417/423.7, 423.8, 424.1
See application file for complete search history.

(56) References Cited

U.S. PATENT DOCUMENTS

| | | |
|---|---|---|
| 3,533,187 A | 10/1970 | Campbell |
| 4,742,257 A | 5/1988 | Carpenter |
| 5,499,902 A | 3/1996 | Rockwood |
| 6,179,558 B1 * | 1/2001 | Eastman et al. ............ 415/121.2 |
| 6,700,235 B1 * | 3/2004 | McAfee .......................... 310/52 |
| 7,939,193 B2 | 5/2011 | Moores, Jr. et al. |
| 2008/0299449 A1 | 12/2008 | Yun et al. |
| 2008/0306415 A1 | 12/2008 | Chan |
| 2011/0303718 A1 * | 12/2011 | Spasov et al. ...................... 227/2 |
| 2012/0003511 A1 | 1/2012 | Timmons et al. |

OTHER PUBLICATIONS

Grainger Catalog. Finish Thompson—Drum Pump Motor, TEFC, 1/2 HP (Dec. 2011).
Jabsco. Drum Pump Motor 16420—Series (2000).
Serfilco. Smart Drum Pump Batch Control System (Apr. 2012).

(Continued)

*Primary Examiner* — Peter J Bertheaud
(74) *Attorney, Agent, or Firm* — Leydig, Voit & Mayer Ltd.

(57) ABSTRACT

A power tool that includes a motor sub-assembly, one or more batteries, and a cooling fan. The motor sub-assembly includes a motor and a motor fan. The one or more batteries are configured to provide power to the motor. The cooling fan is disposed vertically above the motor sub-assembly and the one or more batteries during operation of the power tool, where the cooling fan is configured to draw air in an upwards direction through the cooling fan, thereby dissipating heat from the motor and/or the one or more batteries, and where the upwards direction is the same a free convection direction associated with a density difference between hot air radiating from the motor and/or one or more batteries and surrounding cooler air.

20 Claims, 7 Drawing Sheets (56) References Cited

OTHER PUBLICATIONS

Bare-Tool Hitachi CR18DLP4 18V Lithium-Ion Reciprocating Saw (2008).
Enerpac. Battery Powered Hydraulic Pump—BP-122 (2008).
Omega Engineering, Inc. Motor Driven Drum Pumps—FPUD300 Series (2011).
Drum Pump—ENC SS-39 (retrieved, Aug. 2012).
Burkle. AkkuPump (2004).
Lutz. Battery Pump B1—Operating Instructions (May 2010).
Lutz. Battery Pump B1—Catalog (2010).
Lutz. Pump B2 (Jan. 2003).
Lutz. Pumps B2, B2-A, B 28, B36 (2003).

* cited by examiner

COOLING A DRUM PUMP MOTOR AND/OR BATTERY

BACKGROUND

This disclosure relates to cooling hand-held power tools and, in particular, to cooling a drum pump motor and battery assembly.

Removal of liquid contents from within drums has been effected in a variety of ways, such as by siphoning and/or providing a spigot on an end wall of a drum so as to permit the drum to be positioned in a horizontal manner for gravitational flow discharge of the liquid contents. Liquid dispensing procedures involving the pouring or discharge of the liquid contents through a spigot or the like require that the drum normally be positioned in a horizontal manner so that the drum occupies additional horizontal space with such positioning requiring substantial manual labor. Moreover, movement of drums from a vertical to a horizontal position frequently results in accidental spillage, dropping of the drums and/or physical injury to those in the vicinity and also can create a fire hazard when the contents of the drum are flammable.

Pumps have also been provided on drums for enabling the removal of the liquid drum contents. In some systems, the pump is coupled to a battery-driven motor configured to drive the pump and extract the liquid from the drum into smaller containers. One problem often encountered with such drum pumps is that the motor and/or batteries included in the drum pump generate heat that needs to be dissipated. Currently techniques for dissipating the heat include placing a separate fan near the motor and/or batteries such that the fan blows cool air over the motor and/or batteries to dissipate heat from the motor and/or batteries. Such a cooling system is typically referred to as "forced convection" since the cool air is forced over the heat source. However, such systems have proven to be ineffective at efficiently removing the heat from the drum pump motor and/or batteries.

Accordingly, there remains a need in the art for a system for cooling a drum pump motor and/or batteries that overcomes the limitations of prior approaches.

SUMMARY

One embodiment provides a power tool that includes a motor sub-assembly, one or more batteries, and a cooling fan. The motor sub-assembly includes a motor and a motor fan. The one or more batteries are arranged adjacent the motor and are configured to provide power to the motor. The cooling fan is disposed vertically above the motor sub-assembly and the one or more batteries during operation of the power tool, where the cooling fan is configured to draw air in an upwards direction, over the motor and batteries and through the cooling fan, thereby dissipating heat from the motor and/or the one or more batteries, and where the upwards direction is the same as a free convection direction associated with a density difference between hot air radiating from the motor and/or one or more batteries and surrounding cooler air.

Another embodiment provides a drum pump that includes an inlet for drawing liquid from a drum, an outlet for discharging the liquid drawn via the inlet, and an assembly configured to draw the liquid into the inlet and discharge the liquid out of the outlet. The assembly comprises: a motor sub-assembly that includes a motor and a motor fan, one or more batteries configured to provide power to the motor, and a cooling fan disposed vertically above the motor sub-assembly and the one or more batteries during operation of the drum pump, where the cooling fan is configured to draw air in an upwards direction through the cooling fan, thereby dissipating heat from the motor and/or the one or more batteries, and where the upwards direction is the same as a free convection direction associated with a density difference between hot air radiating from the motor and/or one or more batteries and surrounding cooler air.

Yet another embodiment provides a method for cooling a motor and/or one or more batteries. The method includes: drawing cool air from outside a housing via one or more air intake inlets; and forcing air within the housing through a cooling fan, where the cooling fan is configured to force air in an upwards direction through the cooling fan, thereby dissipating heat from the motor and/or the one or more batteries, and where the upwards direction is the same as a free convection direction associated with a density difference between hot air radiating from the motor and/or one or more batteries and surrounding cooler air.

DETAILED DESCRIPTION

The following examples further illustrate embodiments of the invention but, of course, should not be construed as in any way limiting its scope.

Figure 1:
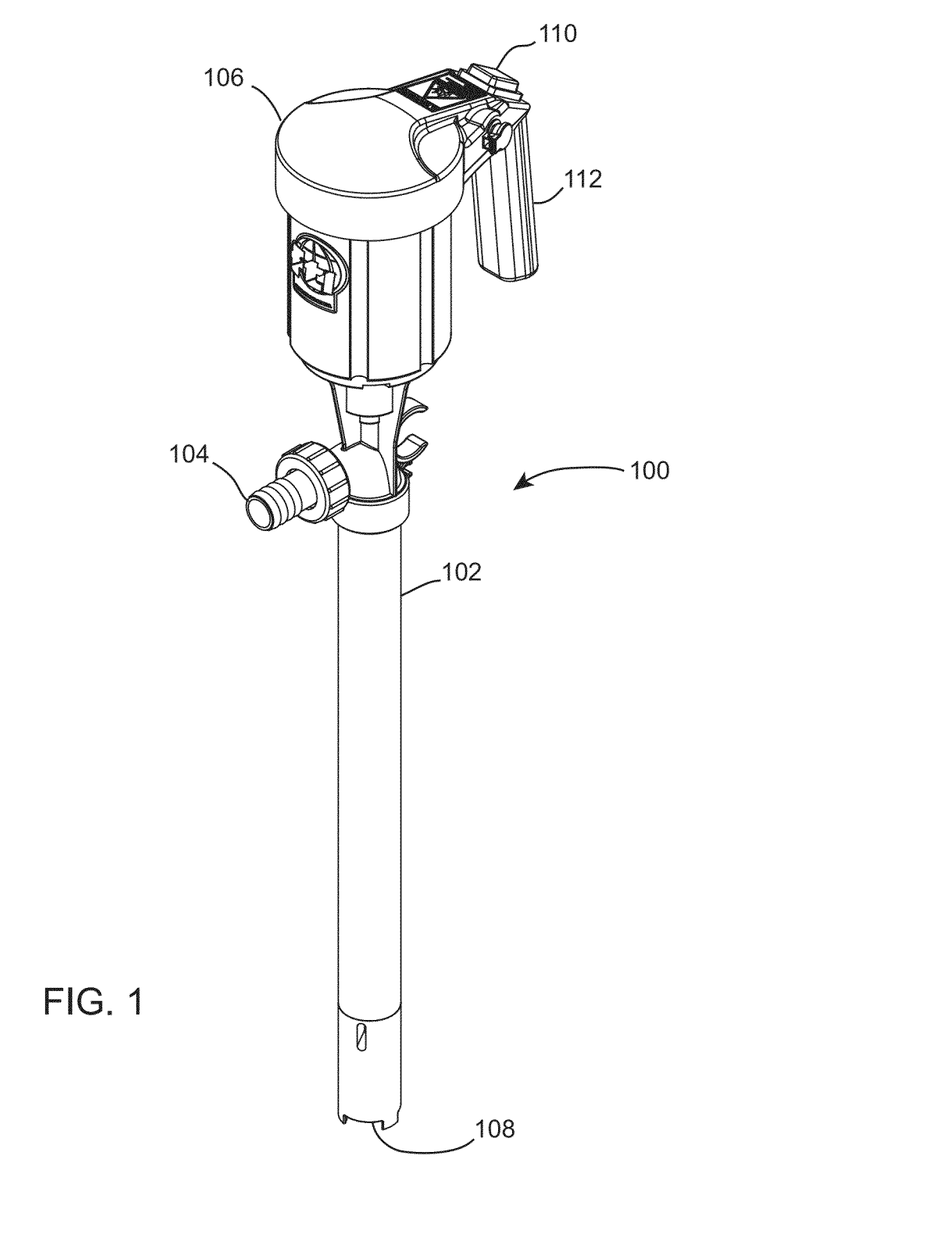
FIG. 1 is a perspective view of a drum pump assembly including a drum pump and battery motor assembly, according to one embodiment of the disclosure.

FIG. 1 is a perspective view of a drum pump assembly 100 including a drum pump 102 and battery motor assembly 106, according to one embodiment of the disclosure. The drum pump 102 includes an inlet 108 and an outlet 104. The inlet 108 can be placed inside a barrel or drum that includes a liquid. The drum pump 102 is operatively connected to the battery motor assembly 106, which includes a motor configured to drive the pump 102 as to draw the liquid into the inlet 108 and force it out of the outlet 104 of the drum pump 102.

The battery motor assembly 106 includes a handle 112 configured to be held by a human operator of the drum pump assembly 100 and a switch or button 110 to be pressed by the human operator when operating the drum pump assembly 100. The switch or button 110, when depressed, is configured to apply electric power to the motor of the battery motor assembly 106, which drives pump 102 to force the liquid from the drum into the inlet 108 and out of the outlet 104 of the drum pump 102.

Figure 2:
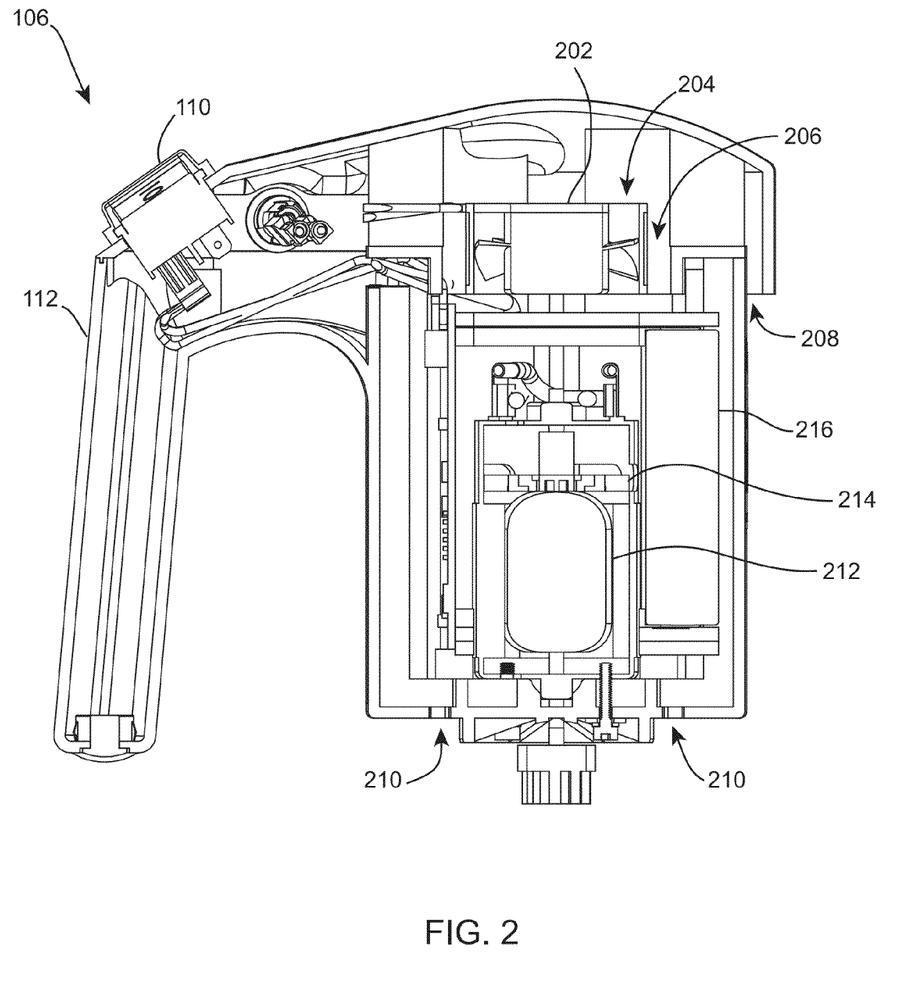
FIG. 2 is a cross-section view of a battery motor assembly, according to one embodiment of the disclosure.

FIG. 2 is a cross-section view of a battery motor assembly 106, according to one embodiment of the disclosure. As shown, the battery motor assembly 106 includes handle 112, button 110, cooling fan 202 having a fan outlet 204, an air recirculation passage 206, a cooling air outlet 208, cooling air inlets 210, a motor 212 having a motor cooling fan 214, and one or more batteries 216. Other elements of the battery motor assembly 106 are not described to avoid obscuring the embodiments disclosed herein.

The motor 212 is located within the battery motor assembly 106. In one embodiment, the motor 212 is permanent-magnet (PM) direct-current (DC) motor. A motor cooling fan 214 is disposed above the motor 212. In some embodiments, the motor cooling fan 214 is integrated with the motor 212 within the same sub-assembly.

One or more batteries 216 are disposed around the motor 212. In one embodiment, six batteries 216 are disposed around the motor 212. For example, the batteries 216 may be spaced equidistant from one another around the motor 212. In some embodiments, the batteries 216 are oriented vertically length-wise within the battery motor assembly 106, such that the longest side of the batteries 216 is vertically oriented when the pump is positioned for operation, as shown in the example in FIG. 2.

The cooling fan 202 is disposed vertically above the motor 212 and the batteries 216. In operation, cool air is drawn into the battery motor assembly 106 through cooling air inlets 210 located at the bottom of the battery motor assembly 106. The cooling fan 202 draws the cool air upwards over the motor 212 and batteries 216, thereby dissipating heat from the motor 212 and batteries 216. The air is then the forced up through the fan outlet 204 of the cooling fan 202 and out of the battery motor assembly 106 via cooling air outlets 208.

In some embodiments, the battery motor assembly 106 includes air recirculation passages 206. Air that is drawn up through the cooling fan 202 can then recirculate down via the air recirculation passages 206 to cool the motor 212 and the batteries 216. In some embodiments, there are no air recirculation passages 206, and all of the air that is drawn up through the cooling fan 202 exits via the cooling air outlets 208.

Figure 3:
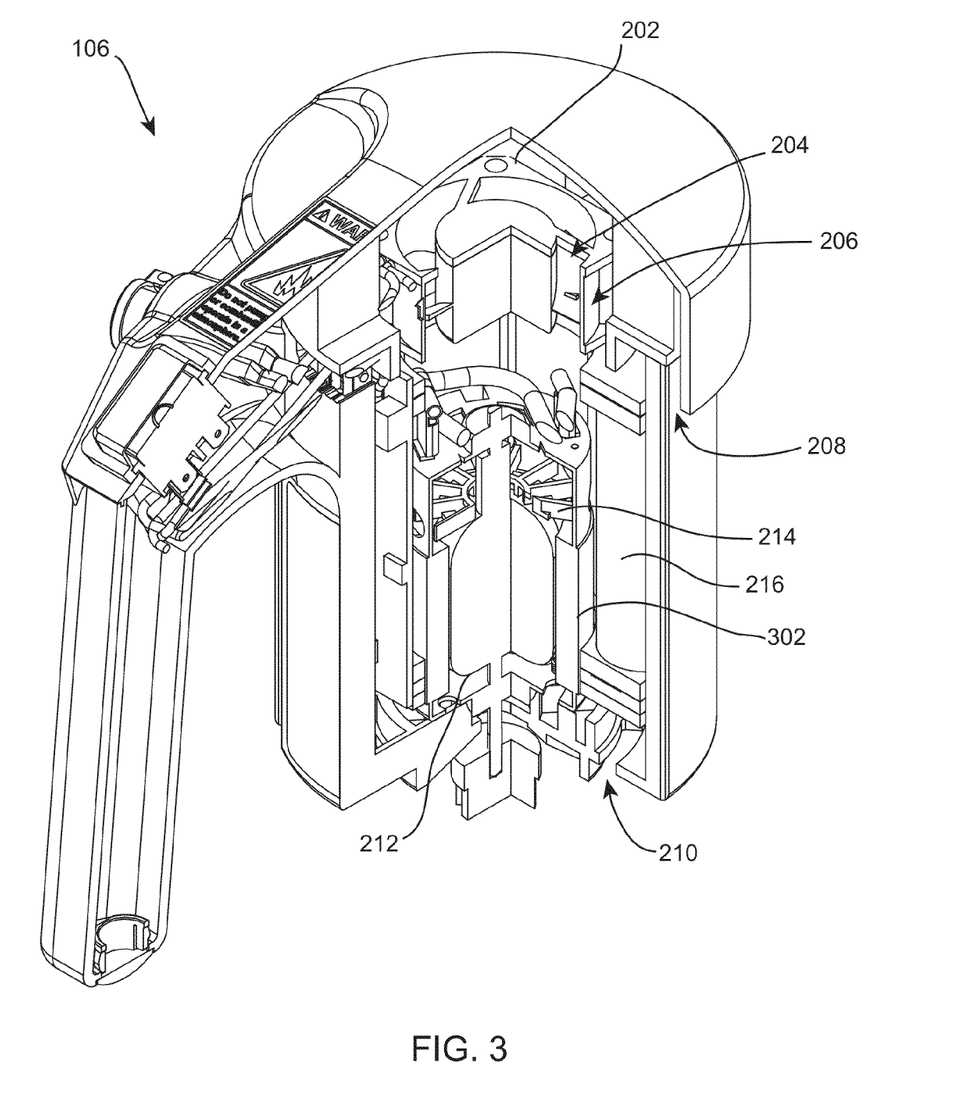
FIG. 3 is a partial cross-section view of a battery motor assembly, according to one embodiment of the disclosure.

FIG. 3 is a partial cross-section view of the battery motor assembly 106, according to one embodiment of the disclosure. As shown, the battery motor assembly 106 includes the cooling fan 202 having a fan outlet 204, an air recirculation passage 206, a cooling air outlet 208, cooling air inlets 210, and a motor sub-assembly 302 that includes a motor 212 and a motor cooling fan 214. One or more batteries 216 can be disposed around the motor sub-assembly 302.

As shown, the motor sub-assembly 302 includes the motor 212 and the motor cooling fan 214 integrated into a single sub-assembly 302. The cooling fan 202 is separate from the motor sub-assembly 302.

As described above, during operation, air enters the battery motor assembly 106 via cooling air inlets 210, passes over the motor 212 and batteries 216 dissipating heat therefrom, flows up through the fan outlet 204 of the cooling fan 202, and out of the battery motor assembly 106 via the cooling air outlet 208. In some embodiments that include air recirculation passages 206, air is recirculated down over the motor 212 and batteries 216 after passing up through the fan outlet 204 of the cooling fan 202.

Accordingly, in some embodiments, the motor and batteries generate heat approaching 95° C. The heat generated fuels an upward air flow. In technical terms, the air flow is called "free convection" and the driving force is the density difference between the hot air and surrounding cooler air. The air flow from the cooling fan 202 is called "forced convection" in engineering terms. As described above, the forced convection cooling of the cooling fan 202 and the free convection of the upward air flow of hot air are in the same direction. With such an "updraft" arrangement, the free convection and forced convection complement one another to create more overall flow and better cooling. By contrast, if the fan discharge from the cooling fan 202 were arranged to force air downwards over the motor and batteries, then the air flow from the cooling fan would be opposite in direction to the free convection and, therefore, the free convection subtracts from the overall flow. The downward air flow rate and cooling effect would be reduced commensurately. Therefore, the updraft arrangement of embodiments of the disclosure provide more efficient cooling than downdraft cooling that forces cool air over the hot motor and batteries.

In embodiments that include the air recirculation passages 206, air is recirculated in the downdraft direction. In some embodiments, better cooling of the motor and batteries is achieved when there are no air recirculation passages 206.

The embodiments described herein are described in relation to a drum pump, but are not limited thereto. Embodiments described herein are equally applicable to any other type of power tool or device including a motor and/or batteries and a cooling fan.

In various embodiments, the cooling fan is configured to cool the batteries during the charge cycle of the batteries, during the discharge cycle of the batteries, and/or during both the charge cycle and the discharge cycle of the batteries.

Figure 4:
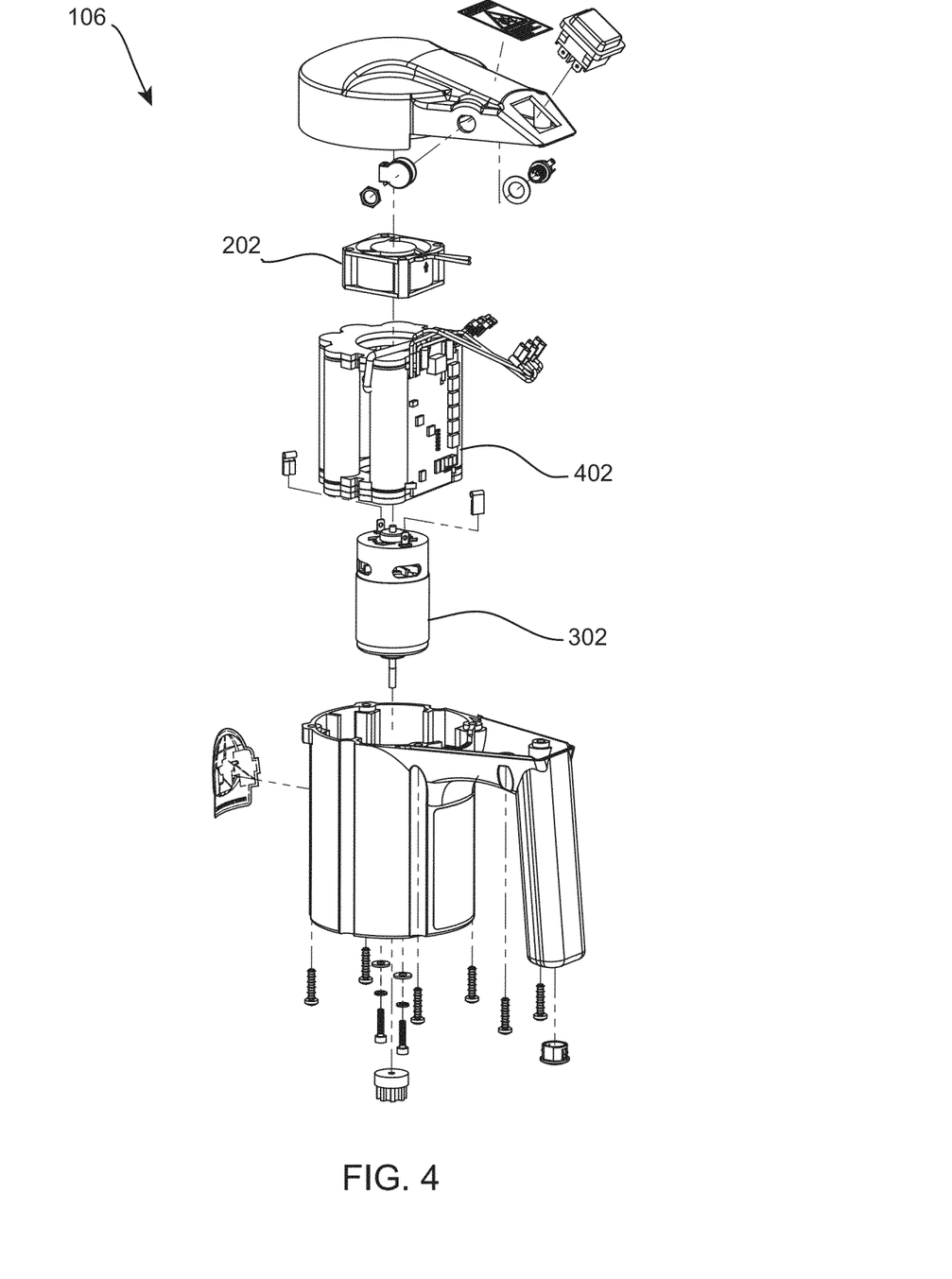
FIG. 4 is an exploded view of a battery motor assembly, according to one embodiment of the disclosure.

FIG. 4 is an exploded view of the battery motor assembly 106, according to one embodiment of the disclosure. As shown, the battery motor assembly 106 includes the motor sub-assembly 302 (that includes a motor and, optionally, a motor cooling fan), a cooling fan 202, and a battery pack 402. The battery pack 402 is configured to include one or more batteries. The motor sub-assembly 302 is configured to fit within an opening included in the center of the battery pack 402. In the example shown, the battery back 402 is configured to include six cylindrical batteries, oriented vertically, and disposed around the motor sub-assembly 302 when the motor sub-assembly 302 is placed within the opening included in the center of the battery pack 402.

In one example, the motor is a brushed low-voltage DC motor and the six batteries are Lithium ion with a manganese cathode. For example, the six batteries are arranged to be 11.1 volts and 3200 mA-hrs. A printed circuit (PC) board may be provided in the battery pack 402 and provides the necessary redundant protections (for example, thermal and current) as well as thermistor protection and a simple cell balancing circuit. The PC board also controls the acceleration and speed for both high and low speeds of the motor. Lithium ion batteries, and especially those with a manganese cathode, are relieved of their stored power quickly and a commensurate rise in temperature is observed. The updraft arrangement described herein is intended to dissipate this heat from the batteries, as well as heat generated by the motor.

Figure 5:
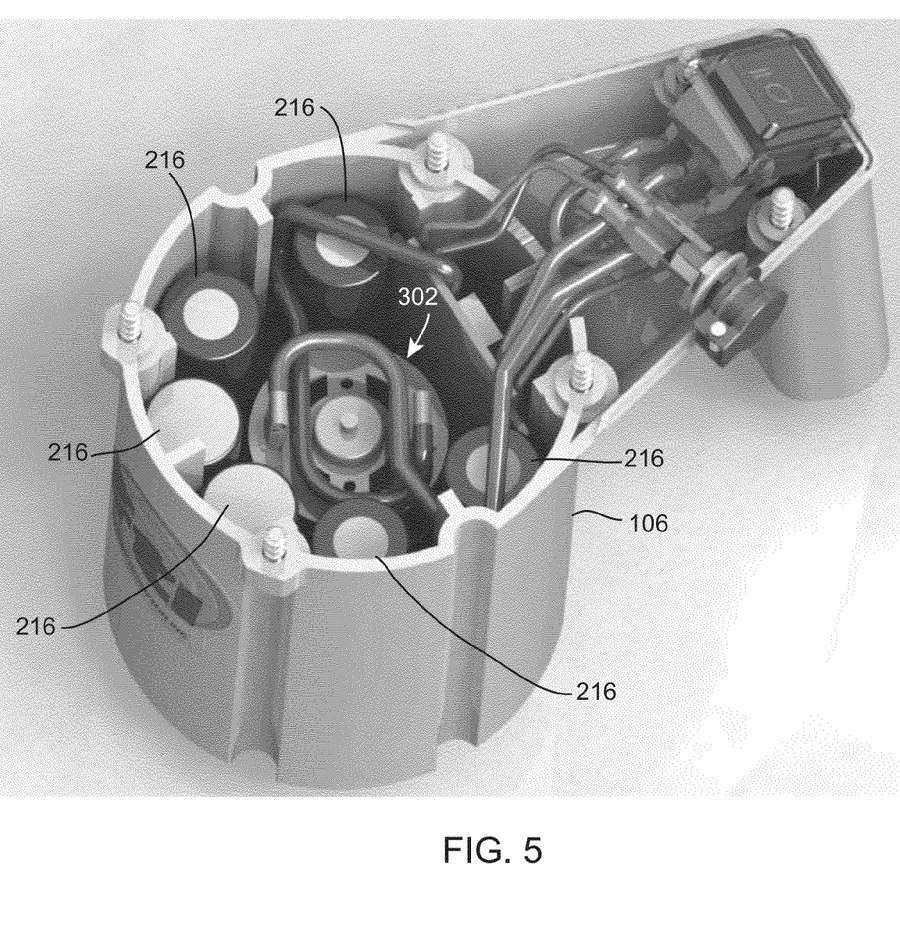
FIG. 5 is a top perspective view of a battery motor assembly with a cover of the battery motor assembly removed, according to one embodiment of the disclosure.

FIG. 5 is a top perspective view of the battery motor assembly 106 with a cover of the battery motor assembly 106 removed, according to one embodiment of the disclosure. Removing the cover exposes the motor sub-assembly 302 and the batteries 216. As shown, in one example, six batteries 216 are disposed around the motor sub-assembly 302.

Figure 6:
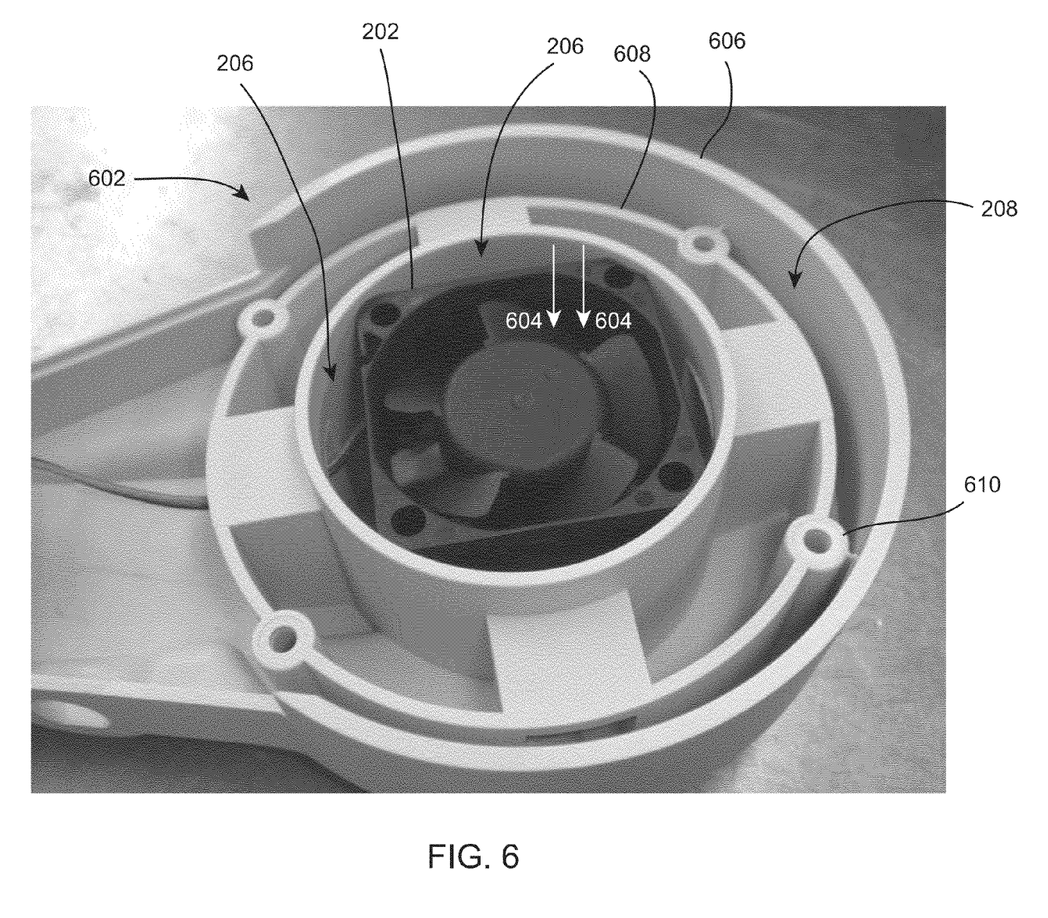
FIG. 6 is a bottom perspective view of the cover of the battery motor assembly, according to one embodiment of the disclosure.

FIG. 6 is a bottom perspective view of a cover 602 of the battery motor assembly, according to one embodiment of the disclosure. The cover 602 can be connected to remaining portions of the battery motor assembly 106, as shown in FIG. 5. FIG. 6 also shows cooling fan 202 embedded in the cover 602. During operation, arrows 604 indicate the direction of air flow through the cooling fan 202. As described, in some embodiments, some of the air may be recirculated back towards the motor and/or batteries via air recirculation passages 206.

The cover 602 includes an outer portion 606 and an inner portion 608. In one embodiment, the inner portion 608 is substantially circular and is connected to the outer portion 606 via fasteners placed within fastener bosses 610. In some embodiments, there is space between the outer portion 606 and the inner portion 608 of the cover 602, such that the air that is drawn through the cooling fan 202 (i.e., in the direction of arrows 604) is able to come around the edge of the inner portion 608 and out via cooling air outlets 208. The arrangement of the inner portion 608 and the outer portion 606 of the cover 602 is further illustrated in FIG. 7.

Figure 7:
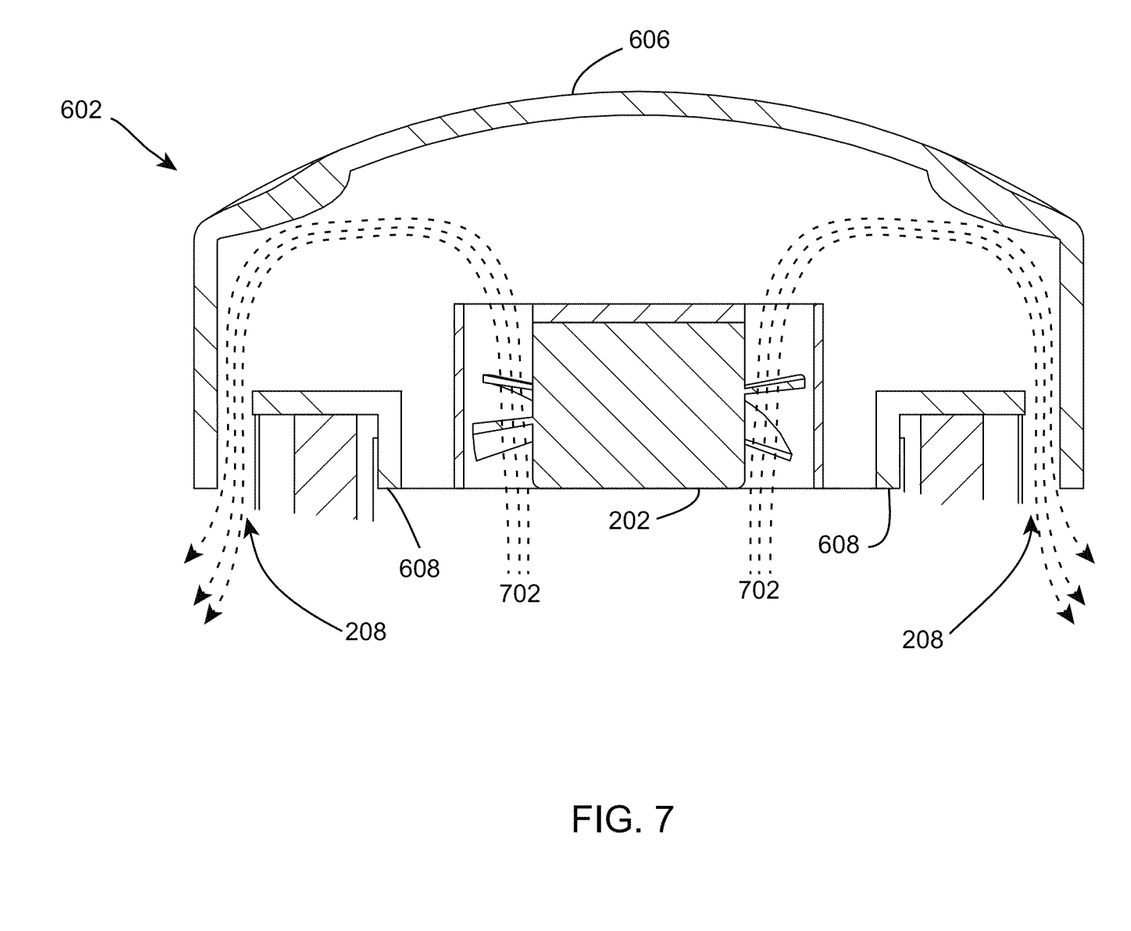
FIG. 7 is a conceptual diagram illustrating a cross-section view of the cover of the battery motor assembly, according to one embodiment of the disclosure.

FIG. 7 is a conceptual diagram illustrating a cross-section view of the cover 602 of the battery motor assembly, according to one embodiment of the disclosure. As shown, the cover 602 includes the inner portion 608 and the outer portion 606. A cooling fan 202 is disposed within the inner portion 608. The cooling fan 202 is configured to draw air via paths 702. As shown, the air flows up through the cooling fan 202, around an edge of the inner portion 608 and out via cooling air outlets 208. In other embodiments, outlets 208 are located on the top of cover 602, in which case air paths 702 are straight up and out, and the updraft effect is enhanced.

Advantageously, in the "updraft" cooling arrangement disclosed herein, the free convection and forced convection add together to create more overall flow and better cooling of the motor and/or batteries included in the battery motor assembly.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A power tool, comprising:
   a motor sub-assembly that includes a motor and a motor fan;
   one or more batteries arranged circumferentially around the motor and are configured to provide power to the motor; and
   a cooling fan disposed vertically above the motor sub-assembly and the one or more batteries during operation of the power tool, wherein the cooling fan is configured to draw air in an upwards direction, over the motor and the one or more batteries and through the cooling fan, thereby dissipating heat from the motor and/or the one or more batteries, and wherein the upwards direction is the same as a free convection direction associated with a density difference between hot air radiating from the motor and/or one or more batteries and surrounding cooler air.

2. The power tool of claim 1, wherein the cooling fan is configured to cool the one or more batteries during a charge cycle of the batteries, during a discharge cycle of the batteries, and/or during both the charge cycle and the discharge cycle of the batteries.

3. The power tool of claim 1, wherein the power tool comprises a drum pump.

4. The power tool of claim 1, further comprising:
   a housing that includes the motor sub-assembly and the one or more batteries; and
   a cover that includes the cooling fan.

5. The power tool of claim 4, wherein the housing includes cooling air inlets through which air flows into the housing.

6. The power tool of claim 5, wherein the cover includes cooling air outlets through which air flows out of the cover after passing through the cooling fan.

7. The power tool of claim 4, wherein the cover includes an outer portion and an inner portion, wherein the cooling fan is located within the inner portion, and a space exists between the inner portion and the outer portion such that air that is forced through the cooling fan exits the cover by flowing between the space between the inner portion and the outer portion.

8. The power tool of claim 7, wherein an air recirculation passage exists between the cooling fan and the inner portion of the cover that allows air that has passed through the cooling fan to be recirculated towards the motor and/or the one or more batteries.

9. The power tool of claim 1, wherein the one or more batteries are lithium-ion batteries.

10. The power tool of claim 1, wherein the one or more batteries comprise at least two batteries that are spaced equidistant from one another circumferentially around the motor.

11. The power tool of claim 1, wherein the one or more batteries comprise at least two batteries, wherein the at least two batteries are oriented vertically length-wise within the power tool, such that the longest side of the at least two batteries is vertically oriented when the power tool is positioned for operation.

12. A drum pump, comprising:
   an inlet for drawing liquid from a drum;
   an outlet for discharging the liquid drawn via the inlet; and
   an assembly configured to draw the liquid into the inlet and discharge the liquid out of the outlet, the assembly comprising:

a motor sub-assembly that includes a motor and a motor fan, one or more batteries arranged circumferentially around the motor and configured to provide power to the motor, and a cooling fan disposed vertically above the motor sub-assembly and the one or more batteries during operation of the drum pump, wherein the cooling fan is configured to draw air in an upwards direction through the cooling fan, thereby dissipating heat from the motor and/or the one or more batteries, and wherein the upwards direction is the same as a free convection direction associated with a density difference between hot air radiating from the motor and/or one or more batteries and surrounding cooler air.

13. The drum pump of claim 12, wherein the cooling fan is configured to cool the one or more batteries during a charge cycle of the batteries, during a discharge cycle of the batteries, and/or during both the charge cycle and the discharge cycle of the batteries.

14. The drum pump of claim 12, wherein liquid discharged via the outlet is collected in a container that is smaller than the drum from which the liquid is drawn via the inlet.

15. The power tool of claim 12, wherein the assembly further comprises:

a housing that includes the motor sub-assembly and the one or more batteries; and a cover that includes the cooling fan.

16. The drum pump of claim 15, wherein the housing includes cooling air inlets through which air flows into the housing.

17. The drum pump of claim 16, wherein the cover includes cooling air outlets through which air flows out of the cover after passing through the cooling fan.

18. The drum pump of claim 15, wherein the cover includes an outer portion and an inner portion, wherein the cooling fan is located within the inner portion, and a space exists between the inner portion and the outer portion such that air that is forced through the cooling fan exits the cover by flowing between the space between the inner portion and the outer portion.

19. The drum pump of claim 18, wherein an air recirculation passage exists between the cooling fan and the inner portion of the cover that allows air that has passed through the cooling fan to be recirculated towards the motor and/or the one or more batteries.

20. The drum pump of claim 12, wherein the one or more batteries comprise at least two batteries that are spaced equidistant from one another circumferentially around the motor.

* * * * *